(12) United States Patent
Huang

(10) Patent No.: US 6,370,576 B1
(45) Date of Patent: Apr. 9, 2002

(54) SYSTEM AND METHOD FOR OBSTACLE-FREE NETWORK COMMUNICATION

(75) Inventor: Cheng-San Huang, Taipei (TW)

(73) Assignee: Nadio.com, Inc., Fremont, CA (US)

( * ) Notice: Subject to any disclaimer, the term of this patent is extended or adjusted under 35 U.S.C. 154(b) by 0 days.

(21) Appl. No.: 09/320,560

(22) Filed: May 27, 1999

(51) Int. Cl.⁷ ............................................. G06F 13/00
(52) U.S. Cl. ...................................................... 709/224
(58) Field of Search ................................. 709/200, 201, 709/203, 216, 217, 218, 219, 224, 225, 227

(56) References Cited

U.S. PATENT DOCUMENTS

| | | | | |
|---|---|---|---|---|
| 5,826,014 A | * | 10/1998 | Coley et al. | 395/187.01 |
| 5,881,232 A | * | 3/1999 | Cheng et al. | 709/217 |
| 5,884,324 A | * | 3/1999 | Cheng et al. | 707/201 |
| 6,061,798 A | * | 5/2000 | Coley et al. | 713/201 |
| 6,065,040 A | * | 5/2000 | Mima et al. | 709/202 |
| 6,070,244 A | * | 5/2000 | Orchier et al. | 709/223 |
| 6,111,673 A | * | 8/2000 | Chang et al. | 370/392 |
| 6,199,164 B1 | * | 3/2001 | Nishimoto et al. | 713/200 |

* cited by examiner

Primary Examiner—Moustafa M. Meky
(74) Attorney, Agent, or Firm—Bever, Hoffman & Harms, LLP; Jeanette S. Harms

(57) ABSTRACT

A system and method for obstacle-free network communication allows two host computers to share data and resources freely without worrying about the restriction of the security systems in their networks. The system and method mainly comprise three software modules namely, Agent module, Initiator module, and Acceptor module. The Agent module is implemented in a computer server for receiving and storing connection requests and data from networks. The Initiator module is implemented in a host computer for sending connection requests and data to the Agent module of the computer server. The Acceptor module is implemented in another host computer for periodically querying the Agent module of the computer server to fetch the connection requests and the data from the Agent module of the computer server. Consequently, even when no direct connection can be established between the two host computers, their communication is still available via the Agent module.

19 Claims, 5 Drawing Sheets

SYSTEM AND METHOD FOR OBSTACLE-FREE NETWORK COMMUNICATION

BACKGROUND OF THE INVENTION

A. Field of the Invention

The present invention relates to a system and method for network communication, especially to a system and method which allows host computers in computer networks to share data and resources without being blocked by security systems.

B. Description of the Prior Art

In a computer network, host computers can share data and resources via a network connection. In such cases, the host computers may either have been configured to grant the access right to designated computers or protected under the same security system. Current Internet technology encourages a distributed system for allocating data and resource over the Internet and then integrates the resources and data via a browser, an operating system or an application software. For instance, a web page may have many reference links to other web pages or forms located in other web sites. Or, a host computer in one city may have access rights to printer resources in a host computer in another city as long as they can establish a network connection.

Conventionally, the network connection is established under the control of the servers or gateways. The server may maintain a database for recording legal connections based on the identifier, network address, or communication protocols. The gateways may block illegal accesses via a list of restricted network addresses. Many enterprises also implement firewalls in their servers or host computers to prevent from illegal accesses. A host computer in an enterprise network may be protected under several layers of security systems. Consequently, with so many security systems built in the networks, the data and resource sharing among host computers is getting more complicated and hard to control. Before a network connection is established, a user may have to pass several identity checks. Thus, it makes real-time data or resource sharing almost impossible.

SUMMARY OF THE INVENTION

Accordingly, it is an object of the present invention to provide a system and method which can provide an obstacle-free communication services on the computer networks, thereby to allow host computers to share data and resources freely without being blocked by their security systems.

It is another object of the present invention to provide a system and method which can allow almost real-time data and resource sharing among host computers, thereby to enhance the network communication.

It is yet still another object of the present invention to provide a system and method which can save the efforts on modifying existing security systems for data and resource sharing on the Internet.

Briefly described, the present invention encompasses a system of obstacle-free network communication. The system mainly comprises three elements, namely Agent module, Initiator module, and Acceptor module. The Agent module is implemented in a computer server while the Initiator module and the Acceptor in host computers. When there is a security system in the network of the Acceptor, the Initiator will sign up a reverse connection request to the Agent. At the same time, the Acceptor will periodically query the Agent to see if there is a connection request for the Acceptor. If there is such a request, the Agent will reply for the Acceptor to build a reverse connection to the Initiator so that the Initiator can send data to the Acceptor.

On the other hand, when both the Initiator and the Acceptor are blocked by security systems, the Initiator will have to sign up a virtual connection request to the Agent and send the data to the Agent. The Acceptor also query the Agent periodically to check if there is a connection request for the Acceptor. If yes, the Agent will reply for the Acceptor to build a virtual connection to the Agent. And then the Acceptor will fetch data from the Agent. Consequently, even when no direct connection can be established between the Iniator and the Acceptor, their communication is still available via the Agent.

When both host computers are blocked by their security systems, the method of the invention comprises the steps of: (1) first, sending a virtual connection request from an Initiator module of a host computer to an Agent module of a computer server. (2) Then, transmitting data from the Initiator module of the first host computer to the Agent module of the computer server. (3) Storing the virtual connection request bound with the data in a storage means of the computer server, such as a memory device, a database, or a hard disk. (4) Periodically querying the Agent module of the computer server from an Acceptor module of the second host computer to see if the storage means is empty. (5) When the storage means is not empty, fetching the virtual connection request and the data from the computer server.

On the other hand, when only the Acceptor is protected under a security system, the method of the invention comprises the steps of: (1) Sending a reverse connection request from the Initiator to an Agent. (2) Storing the reverse connection request in a storage means of the Agent, such as a database, a memory device, or a hard disk. (3) Periodically querying the Agent from an Acceptor to see if the storage means is not empty. (4) when said storage means is not empty, fetching the reverse connection request from the Agent to said Acceptor. (5) Establishing a reverse connection from the Acceptor to the Initiator to receive data from the Initiator.

When there is no security system between the Acceptor and the Initiator, the Acceptor and the Initiator can communicate to each other without the coordination of the Agent.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

To solve the problems stated above, the present invention implements three software modules namely, Initiator module, Agent module, and Acceptor module in different host computers. Accordingly, for the convenience of description, hereinafter a host computer implemented with an Initiator module will be called an Initiator. A host computer implemented with an Acceptor module will be called an Acceptor. A server implemented with an Agent module will be called an Agent. A host computer may have an Initiator module and an Acceptor module implemented together in its system while the Agent module must be implemented in a standalone server.

The Initiator module is activated when the host computer wants to send data to another host computer. The Acceptor module is activated when the host computer is expecting data from another host computer. The Agent module functions as a coordinator for communicating between the Acceptor module and the Initiator module. The server of the Agent module maintains a database for registered Acceptor modules of host machines and keeps the transmitted data and requests in the queue of the server, such as a database, a hard disk or a memory device. The queues are arranged in a table. Each table records necessary information for an Acceptor such as, the connection type, control data, source address, destination address, identifier and data to be transmitted.

Figure 1:
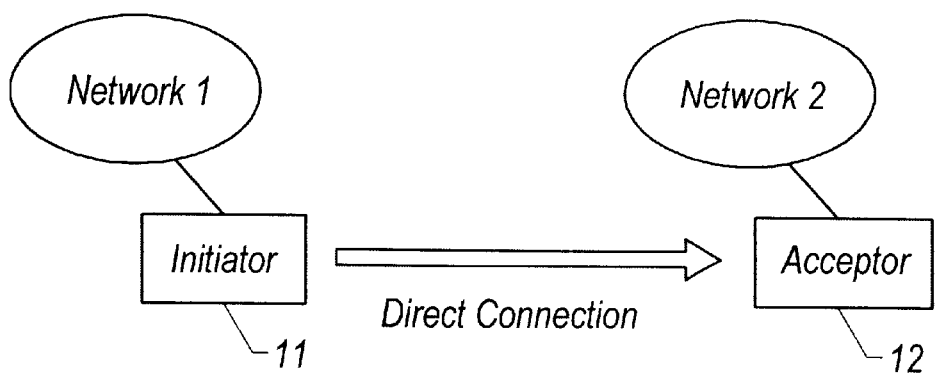
FIG. 1 is a schematic diagram showing the control flows for the Initiator and Acceptor when a direct connection can be established between them according to the preferred embodiment of the present invention.

In general, we may use three network situations to illustrate the operations of the three software modules. The first situation is that there are no security systems between the Initiator and the Acceptor at all. As illustrated in FIG. 1, the Initiator 11 and the Acceptor 12 are located at different networks. Since there is no security systems between them, as long as the Acceptor 12 can accept the connection request of the Initiator 11, the Initiator 11 can send data to the Acceptor 12 and use the resources in the Acceptor 12 directly. If the Initiator 11 and the Acceptor 12 are in the same network, the direct connection also applies as long as there is no security system implemented in their host computers.

Figure 2:
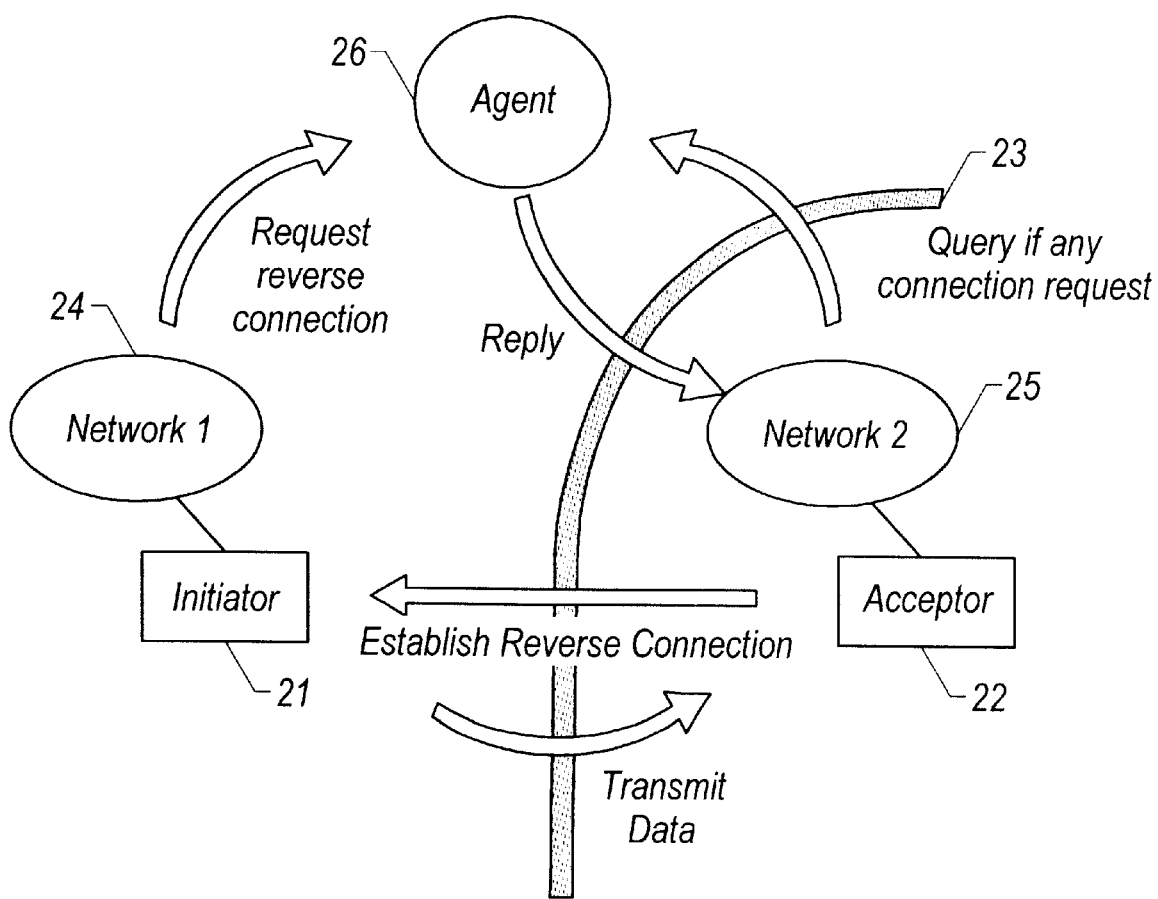
FIG. 2 is a schematic diagram showing the control flows for the Initiator, Agent, Acceptor when there are security systems at the Acceptor's site according to the preferred embodiment of the present invention.

FIG. 2 illustrates the second situation in which there is a security system 23 for Network 2 25 where the Acceptor 22 locates. The security system 23 may be a proxy server, a firewall or any security application software. In this case, the Initiator 21 cannot access the Acceptor 22 directly. Instead, the Initiator 21 in Network 1 24 sends a reverse connection request to the Agent 26 first. Then, the Agent 26 stores the reverse connection request in the queue of the server, such as a database, a hard disk or a memory device. The Acceptor 22 queries the Agent 26 periodically to see if there is any connection request coming in. If there is a reverse connection request for the Acceptor 22, the Agent 22 will reply to the Acceptor 22. Then the Acceptor 22 will establish a reverse connection to the Initiator 21. Consequently, the Initiator can send data directly to the Acceptor 22.

From the control flows as illustrated in FIG. 2, we can see that the Acceptor 22 can receive data from the Initiator 21 without being verified by the security system 23. Since the connection to the Initiator 21 is established by the Acceptor 22, and the Agent 26 is in a trusted relationship to the Acceptor 22, so there is no illegal access to the security system 23 of network 2 25. Since this connection is indirect, so there will be a little transmission delay. Nevertheless, the data transmission is the same as the situation illustrated in FIG. 1.

Figure 3:
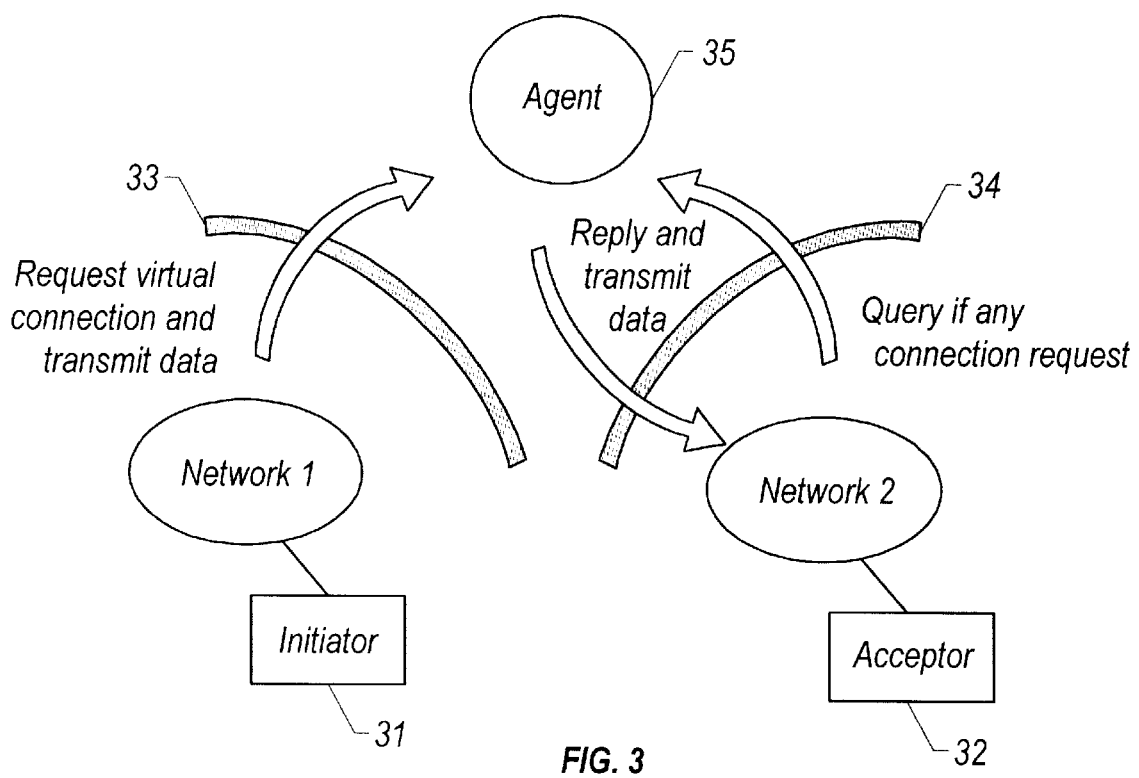
FIG. 3 is a schematic diagram showing the control flows for the Initiator, Agent, Acceptor when there are security systems at both the Acceptor's site and the Initiator's site according to the preferred embodiment of the present invention.

FIG. 3 illustrates the third situation in which Initiator 31 and Acceptor 32 are protected by the security systems 33, 34 respectively in their network systems. In this case, both Initiator 31 and Acceptor 32 cannot accept a direct connection from a host computer. The Initiator 31 and the Acceptor 32 must rely on Agent 35 to build virtual connections and transmit data. The Initiator 31 will sign up a virtual connection request to Agent 35. After the connection to Agent 35 is established, the Initiator 31 transmits data to Agent 35. After receiving the request for virtual connection and the data from the Initiator 31, the Agent 35 will bind the data with the virtual connection request in the queue, such as a database, a hard disk or a memory device. On the other hand, the Acceptor 32 queries the Agent 35 periodically to see if there is any virtual connection request for the Acceptor 32. If there is such request, the Agent 35 will reply to the Acceptor 32 and transmit the data to the Acceptor 32.

It should be noted that the connection from Initiator 31 to the Agent 35 and the connection from Acceptor 32 to the Agent 35 are parallel so that the transmission time can be reduced. However, the third situation will obviously be longer than the second situation with the trade-off of security concern. Such connection will cause no security threat to the security systems 33 and 34 because both the Initiator 31 and the Acceptor 32 are in a trusted relationship to the Agent 35. Moreover, there is no direct connection between the Acceptor 32 and the Initiator 31.

However, the security issue for the connection between the Initiator 31 and the Acceptor 32 is now shifted to the Agent 35. If the Agent 35 cannot guarantee a trustee connection between the Initiator 31 and the Acceptor 32, the Acceptor 32 may still get wrong or error data. For this reason, the Agent 35 maintains a database for security check which maintains information about the registered Acceptors in the Internet. Each registered Acceptor is thus supposed to be trusted. The information includes at least unique identifiers, such as identification numbers or names, and network addresses. Then, the Agent will build a table for each Acceptor. Each table contains multiple entries representing queues for storing the requests and data from the Initiator. The table contains information like the source address, destination address, and control data for each connection. For virtual connections, the table will further include data from the Initiators. Each Acceptor can use its own identification number or name to query the database and fetch data. On the other hand, the Agent accepts connection requests from Initiator without limitation. Its function is very much like a web server waiting to be accessed. After a simple sign-up up procedure, an Initiator may be able to send data to a registered Acceptor. After all, the object of the Agent is not intended to provide further obstacle to the Internet communication.

Figure 4:
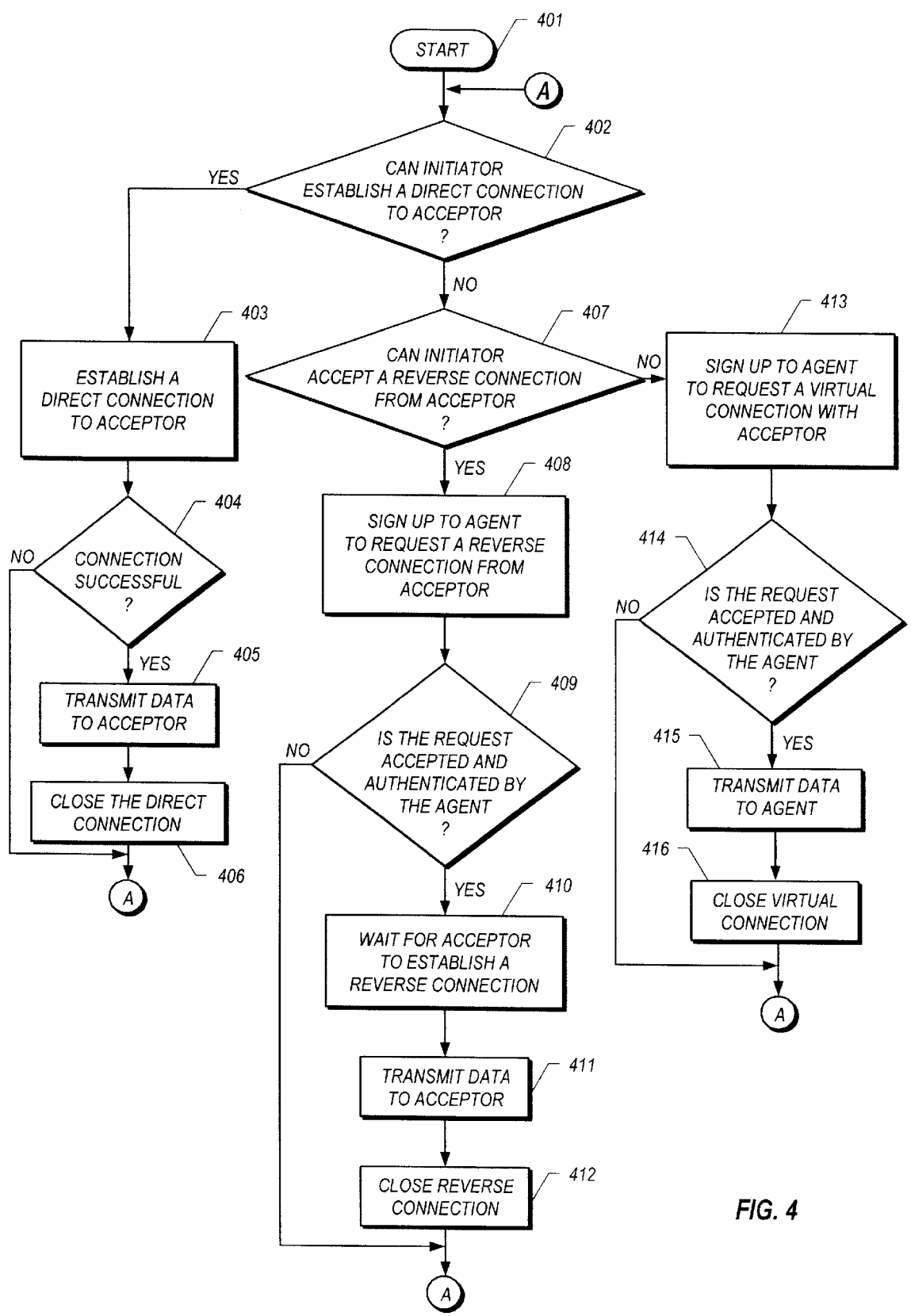
FIG. 4 is a flow chart showing the operation steps of the Initiator module according to the preferred embodiment of the present invention.

The detailed operations of the Initiator can be illustrated more clearly in FIG. 4. Refer to FIG. 4, step 401: first, activate the Initiator. When the Initiator wants to share a resource in the networks, it has to check if a direct connection can be established between the Initiator and the Acceptor, step 402. If yes, that means there is no security systems between the Initiator and the Acceptor. So, go to step 403. Otherwise, go to step 407.

At step 403, the direct connection between the Acceptor and the Initiator can be established via any network facility, such as using a MODEM for dial-up connections, or using a dedicated network connection. Step 404, check if the connection is successfully established? If yes, go to step 405. If not, return to step 402. Step 405, after the connection is established, the data can be transmitted to the Acceptor directly. Step 406, then the direct connection will be closed after the data transmission is complete.

At step 407, further check if Initiator can accept a reverse connection from Acceptor? If it can, that means the Acceptor is located at a network having security systems, so go to step 408. If it cannot, that means both the Initiator and the Acceptor have security systems in their networks, so go to step 413.

At step 408, the Initiator signs up to Agent to request a reverse connection from Acceptor. At step 409, check if the request is accepted and authenticated by the Agent? If yes, go to step 410. If not, return to step 402. Step 410, the authenticity of the Initiator is passed and the request is accepted by the Agent, so the Initiator waits for the Acceptor to establish a reverse connection. Step 411, after the reverse connection is established, the Initiator will transmit data directly to Acceptor. Step 412, after the transmission is complete, the reverse connection will be closed and return to step 402.

Step 413, since the Initiator and the Acceptor are located in networks having security systems, so none of them can receive a connection request from other host computers. The Initiator has to sign up to Agent to request a virtual connection with the Acceptor. Step 414, check if the request is accepted and authenticated by the Agent? If yes, go to step 415. If not, return to step 402. Step 415, after the connection is established, the Initiator transmits data to Agent. Step 416, when the transmission is complete, the virtual connection will be closed and return to step 402.

Figure 5:
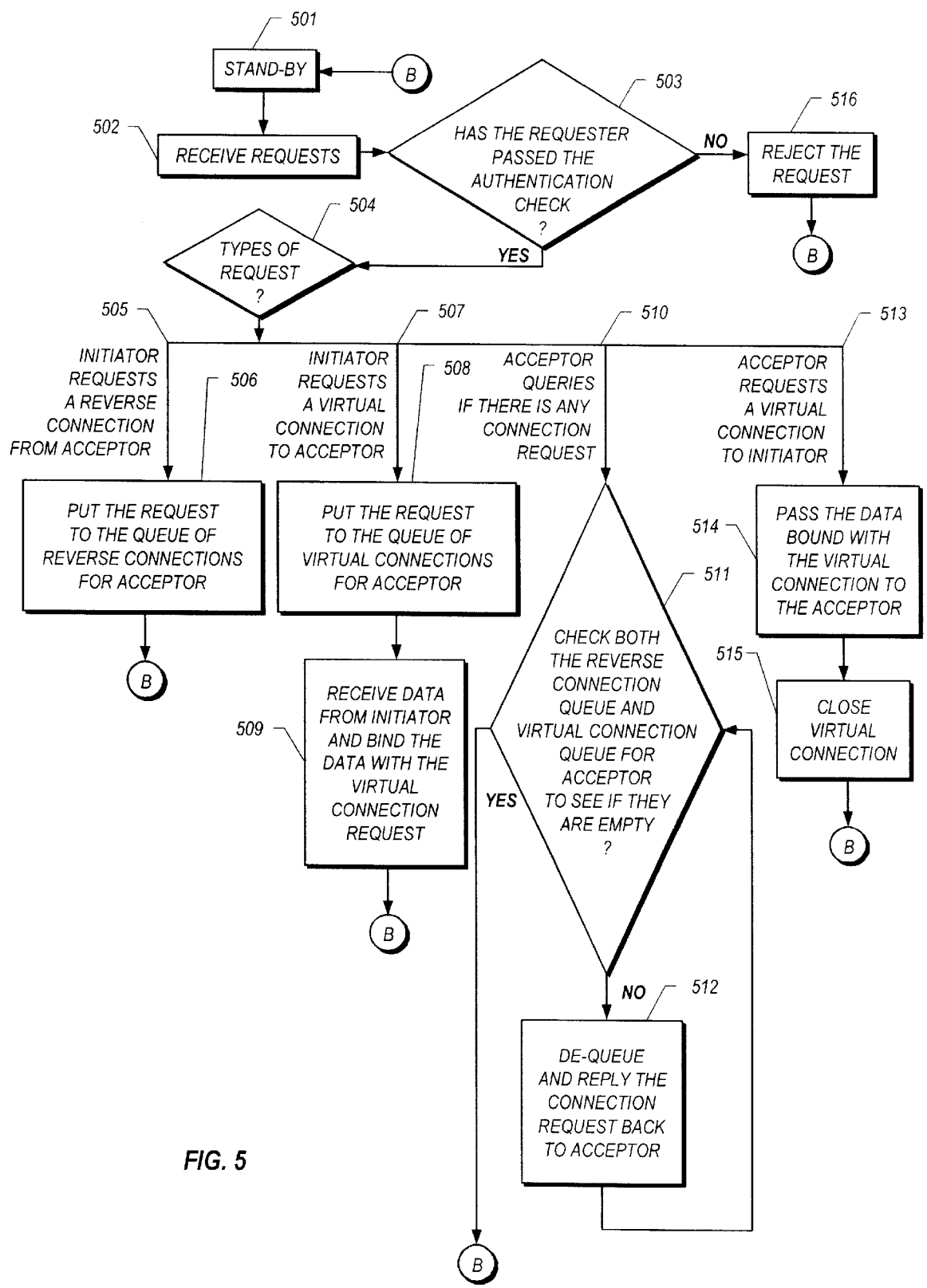
FIG. 5 a flow-chart showing the operation steps of the Agent module according to the preferred embodiment of the present invention.

Refer to FIG. 5 for the detailed processes of the Agent. At step 501, the Agent is waiting for being accessed and getting requests or data. At step 502, the Agent receives a request. Step 503, the Agent checks the authenticity of the requester according to the records stored at its database. If the authenticity of the requester is accepted, go to step 504. If not, go to step 516 to reject the request and then return to step 501.

Step 504, the Agent checks the types of the request. There are four types: (505) The Initiator requests a reverse connection from Acceptor, (507) The Initiator requests a virtual connection to Acceptor, (510) The Acceptor queries if there is any connection requests, and (513) The Acceptor requests a virtual connection to Initiator.

Step 506, since the Initiator cannot access the Acceptor directly, the Agent receives the request from the Initiator and puts the request in the queue for the reverse connection of the Acceptor and then return to step 501.

Step 508, the Agent puts the request to the queue for the virtual connection of the Acceptor. Step 509, the Agent receives data from the Initiator and then binds the data with the request for the virtual connection and then return to step 501.

Step 511, the Agent checks both the reverse connection queue and virtual connection queue for the Acceptor to see if they are empty. If yes, go to step 501. If not, go to step 512. Step 512, since there is data in the queue, so dequeue and reply the connection request back to the Acceptor and then go back to step 511.

Step 514, the Agent passes the data bound with the virtual connection to the Acceptor. Step 515, after the data is sent to the Acceptor, the virtual connection is closed and then return to step 501. Step 509 and step 514 are processed concurrently so that the data transmission and data receiving can be run in parallel. Consequently, the data transmission occurred almost in real-time.

Figure 6:
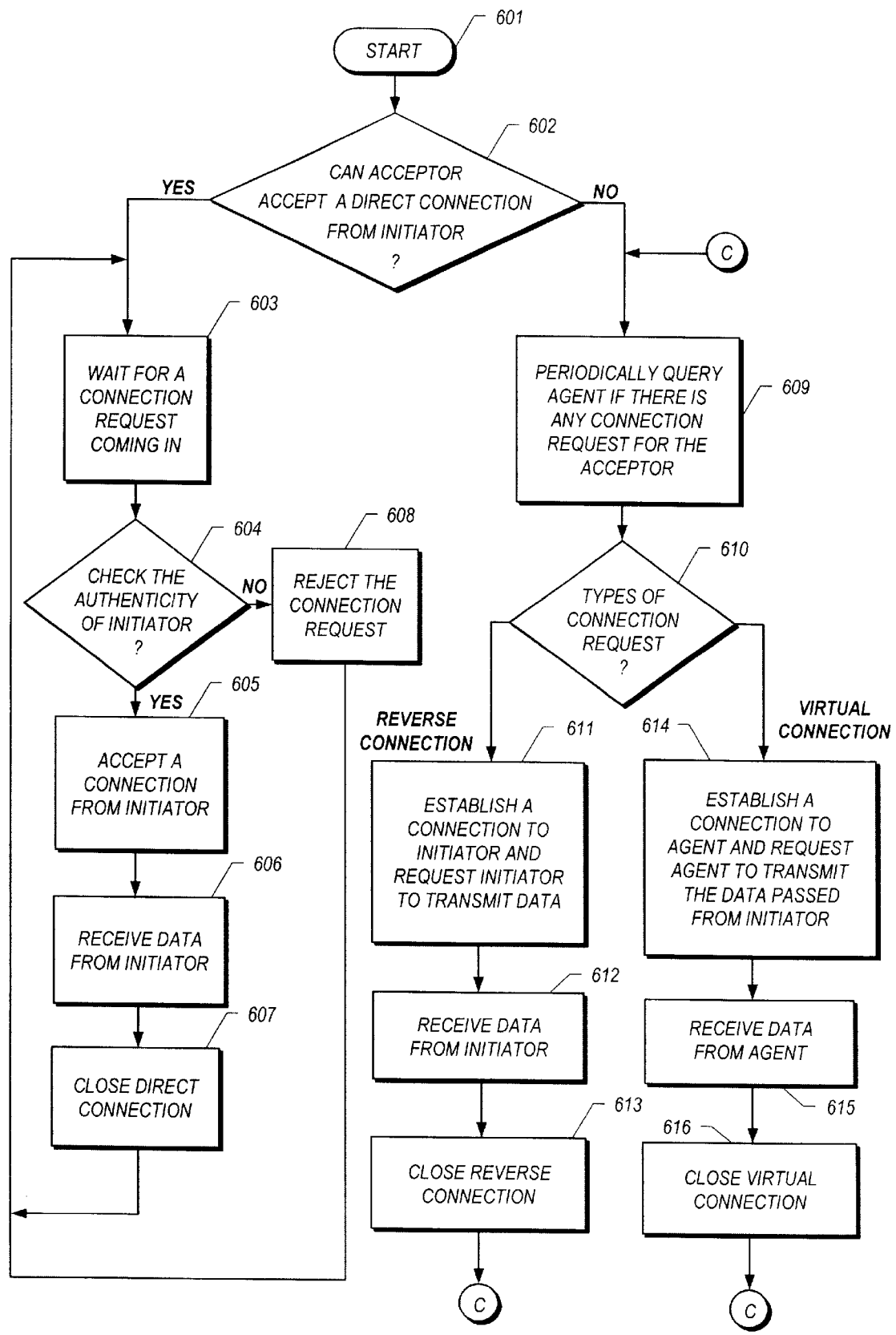
FIG. 6 a flow-chart showing the operation steps of the Acceptor module according to the preferred embodiment of the present invention.

Refer to FIG. 6 for the processes of the Acceptor. Step 601, Acceptor starts. Step 602, the Acceptor checks if it can accept a direct connection request from the Initiator? If yes, go to step 603. If not, go to step 607.

Step 603, the Acceptor waits for a connection request coming in. Step 604, check the authenticity of the Initiator of the connection request. If the authenticity check is passed, go to step 605. If not, go to step 608 to reject the connection request and return to step 603. Step 605, the Acceptor accepts a direct connection request from the Initiator. Step 606, after the connection is established, the Acceptor receives data from the Initiator. Step 607, after the transmission is complete, the direct connection is closed and go to step 603.

Step 609, the Acceptor periodically queries the Agent to check if there is any connection requests for the Acceptor. Step 610, after a request comes, check the type of connection request. If it is reverse connection, go to step 611. If it is virtual connection, go to step 614.

Step 611, the Acceptor establishes a connection to the Initiator and requests the Initiator to transmit data. Step 612, the Acceptor receives data from the Initiator. Step 613, after the transmission is complete, the reverse connection will be closed and go to step 609.

Step 614, the Acceptor establishes a connection to the Agent and requests Agent to transmit the data which is passed from the Initiator. Step 615, the Acceptor receives the data from Agent. Step 616, after the transmission is complete, the virtual connection is closed and go to step 609.

To sum up, the Agent performs like a coordinator in the networks. It allows any host computer to sign up as an Initiator and registered as an Acceptor. Host computers can then share data or resources freely without worrying about the restrictions in the existing security systems. The communication between the Initiator and the Acceptor will not jeopardize the original security systems.

A preferred embodiment has been described in detail hereinabove. It is to be understood that the scope of the invention also comprehends embodiments different from the one described, yet within the scope of the claims. For example, the data fields for the Agent database can be designed based on practical application. It can include group IDs to classify registered host computers. Also, data sizes, data types can be added to the database for further restrictions.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A system for obstacle-free network communication, comprising:

Agent means for receiving and storing a plurality of connection requests and data from networks;

Initiator means for sending connection requests and data to said Agent means; and Acceptor means for periodically querying said Agent means to fetch said connection requests and said data from said Agent means.

2. The system as claimed in claim 1, further comprising:

a database implemented in said Agent means for storing information about a plurality of registered Acceptors; and a table implemented in said Agent means for storing said connection requests and said data.

3. The system as claimed in claim 2, wherein said information about said registered Acceptors means comprises:

unique identifiers, and network addresses.

4. The system as claimed in claim 2, wherein the data entries for said table comprise:

source addresses, destination addresses, and identifers of said Acceptor means.

5. The system as claimed in claim 1, wherein said Iniator means and said Acceptor means are software modules implemented in host computers which are located at different networks each having at least a security system, and said Agent means is a software module implemented in a computer server.

6. The system as claimed in claim 5, wherein said Agent means receives a first virtual connection request from said Initiator means and a second virtual connection request from said Acceptor means.

7. The system as claimed in claim 6, wherein said Agent means receives data from said Initiator means and passes said data bound with said first virtual connection request to said Acceptor means at the same time.

8. The system as claimed in claim 1, wherein said Acceptor means is located at a network having at least a security system and said Initiator means is located at a network having no security system.

9. The system as claimed in claim 8, wherein said Agent means receives a reverse connection request from said Initiator means.

10. The system as claimed in claim 8, wherein said Acceptor means establishes a reverse connection to said Initiator means and acceptes data transmitted directly from said Initiator means.

11. The system as claimed in claim 1, wherein said Initiator communicates directly with said Acceptor when there is no security system therebetween.

12. A method for obstacle-free network communication between two host computers located at different networks both having security systems, comprising the steps of:

sending a virtual connection request from Initiator means to an Agent means;

transmitting data from said Initiator means to said Agent means;

storing said virtual connection request bound with said data in a storage means of said Agent means;

periodically querying said Agent means from Acceptor means to determine if said storage means is not empty; and when said storage means is not empty, fetching said virtual connection request and said data from said Agent means to said Acceptor means.

13. The method as claimed in claim 12, further comprising:

registering the information of said Initiator means and said Acceptor means in a database of said Agent means.

14. The method as claimed in claim 13, wherein said information comprises:

identifier of said Acceptor means, and network address of said Acceptor means.

15. The method as claimed in claim 12, wherein said step of transmitting data to said Agent means and said step of fetching said data from said Agent means are executed concurrently.

16. A method for obstacle-free network communication between Initiator means and Acceptor means, wherein said Initiator means locates in a network without a security system while said Acceptor means in a network protected by at least a security system, comprising the steps of:

sending a reverse connection request from said Initiator means to Agent means;

storing said reverse connection request in a storage means of said Agent means;

periodically querying said Agent means from an Acceptor means to determine if said storage means is not empty;

when said storage means is not empty, fetching said reverse connection request from said Agent means to said Acceptor means; and establishing a reverse connection from said Acceptor means to said Initiator means to receive data therefrom.

17. The method as claimed in claim 16, further comprising the step of:

registering the information about said Initiator means and said Acceptor means in a database of said Agent means.

18. The method as claimed in claim 17, wherein said database is established according to said identifier of said Acceptor means.

19. The method as claimed in claim 16, wherein said information comprises:

an identifier of said Acceptor means, and a network address of said Initiator means.

* * * * *